United States Patent [19]

Nishimura et al.

[11] 4,264,970
[45] Apr. 28, 1981

[54] LIQUID CRYSTAL DISPLAY CELL FOR AN ELECTRONIC TIMEPIECE

[75] Inventors: Katsuo Nishimura, Iruma; Takatoshi Nakayama; Toshihiko Nakayama, both of Tokorozawa, all of Japan

[73] Assignee: Citizen Watch Company Limited, Tokyo, Japan

[21] Appl. No.: 943,391

[22] Filed: Sep. 18, 1978

[30] Foreign Application Priority Data

Oct. 28, 1977 [JP] Japan .................................. 52/129332
Oct. 28, 1977 [JP] Japan .................................. 52/129333
Mar. 31, 1978 [JP] Japan .................................. 53/37632

[51] Int. Cl.³ ........................................... G04C 17/00
[52] U.S. Cl. ...................................... 368/242; 368/82; 368/84; 368/239
[58] Field of Search ............... 58/50 R, 126 R, 127 R; 350/343, 334, 330, 335, 336; 65/31; 156/625; 368/82, 84, 242, 239

[56] References Cited

U.S. PATENT DOCUMENTS

| 3,281,294 | 10/1966 | Martin | 65/31 X |
| 3,841,083 | 10/1974 | Bergey | 58/50 R |
| 3,911,665 | 10/1975 | Van Berkum | 58/4 A X |
| 3,945,191 | 3/1976 | Van Berkum | 58/50 R |
| 4,026,103 | 5/1977 | Ichikawa et al. | 350/330 X |
| 4,104,727 | 8/1978 | Washizuka et al. | 350/334 X |

OTHER PUBLICATIONS

P. Grodzinski, "Diamond Tools", Anton Smit & Co., Inc., 333 West 52 St., New York, p. 169, 1944.

*Primary Examiner*—Ulysses Weldon
*Attorney, Agent, or Firm*—Holman & Stern

[57] ABSTRACT

A liquid crystal display cell for use in an electronic timepiece having an analog display of time by time indicating hands combined with a digital display, said liquid crystal display cell being of polygonal profile in plan, with one internal angle of said profile being in the range 180 degrees to 360 degrees.

2 Claims, 33 Drawing Figures

LIQUID CRYSTAL DISPLAY CELL FOR AN ELECTRONIC TIMEPIECE

This invention relates to electronic devices such as electronic timepieces having combined analog and digital display of information by means of time indicating hands and a liquid crystal cell, and in particular to an electronic timepiece incorporating a liquid crystal cell having a more complex profile than that of liquid crystal cells utilized heretofore in electronic timepieces, whereby a compact and attractive combined analog/digital display of information can be obtained.

Various types of liquid crystal cells have been utilized to display information in digital or character form in electronic devices such as electronic wristwatches. These include dynamic scattering (DS) mode cells, twisted nematic (TN-FE) mode cells in which the plane of polarization of light passing through the cell is rotated, and guest-host (GH) type cells in which molecules of a material such as a dye are sympathetically rotated by the action of adjacent liquid crystal molecules. Such liquid crystal cells have achieved widespread practical application. Such a liquid crystal cell generally consists of a pair of substrates comprising thin plates of glass, sealed at their common periphery, between which a layer of liquid crystal material is sandwiched. In order to display information, electric fields are applied to selected portions of the liquid crystal material, by means of voltages applied to transparent electrodes on the interior surfaces of the substrates. Such liquid crystal cells have heretofore generally been of simple profile, as viewed in plane, such as a rectangle, octagon, circle, etc. This has been due in some measure to the difficulties encountered in mass production of liquid crystal cell substrates of more complex profile by utilizing conventional methods of cutting the substrates. Due to the use of such simple profiles for the liquid crystal cells, the various electronic wristwatches produced by different manufacturers are, broadly speaking, of rather similar appearance.

In addition, there is at present a requirement for electronic timepieces which incorporate both analog (by means of time indicating hands) and digital (by means of a liquid crystal display cell) displays of information. In such a timepiece, a display area of roughly circular shape is required for the analog display portion, due to the use of rotating hands. If a liquid crystal display cell of simple profile such as an octagon or rectangle is used for the digital portion of the display, then it will generally be necessary to place the analog portion of the display above or below the digital portion. It therefore becomes difficult to provide a compact and attractive combined analog/digital display.

In an electronic timepiece according to the present invention, a special shape of liquid crystal cell is used, so that a much greater freedom in the design of the timepiece is afforded, by comparison with electronic timepieces of the prior art. In addition, the profile of the liquid crystal cell may be freely selected such that a compact and elegant combination of an analog display using time indicating hands with a digital display of information by means of the liquid crystal cell may be obtained. Methods will be described in the following whereby liquid crystal cells having such desirable profiles may be easily and economically manufactured in quantity.

It is therefore an object of the present invention to provide an improved liquid crystal cell.

It is a further object of the present invention to provide an electronic timepiece having a combined analog display of information by means of time indicating hands with a digital display of information by means of a liquid crystal cell whereby said combined display may be made more compact than combined analog and digital displays in electronic timepieces of the prior art.

It is yet a further object of the present invention to provide methods whereby liquid crystal cells having a complex profile may be manufactured on a mass production basis.

Further objects, features and advantages of the present invention will be made apparent by the following description, when taken in conjunction with the attached drawings, in which.

Hitherto, there have been various proposals for electronic timepieces having combined analog and digital display functions, whereby time information is shown by means of time indicating hands while time or other information is displayed by means of digits and/or characters generated by means of a liquid crystal display cell. However, since only liquid crystal cells having relatively simple profiles, such as a square, circle, polygon, etc, have been used in such timepieces, it has not been possible to achieve a combined analog/digital display which is compact, easy to read, and of attractive design. With an electronic timepiece in accordance with the present invention, a liquid crystal cell is utilized for the display of digital information which is shaped in such a way that an analog time display section having an approximately circular outline, or which is in the form of a regular polygon, can be conveniently combined with the digital information display section.

Figure 1:
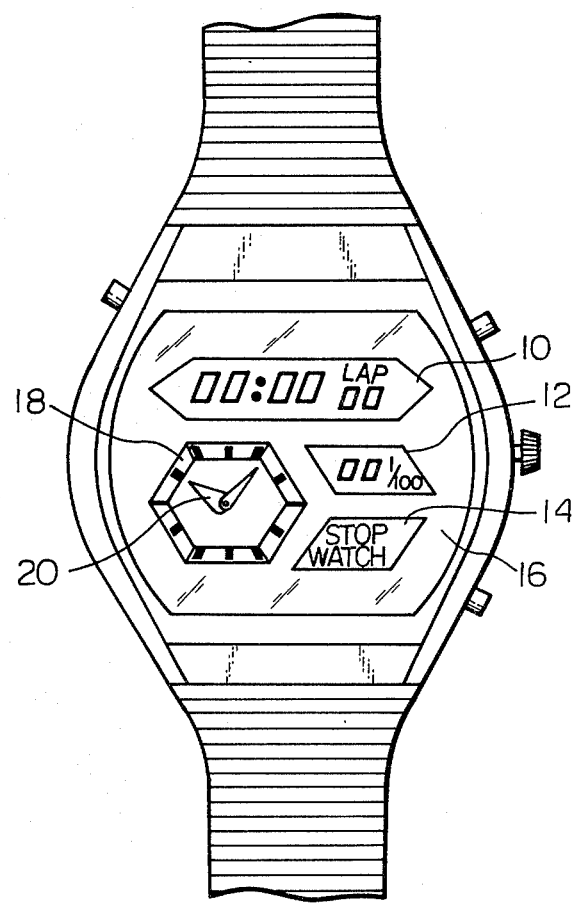
FIG. 1 is an external view of an electronic timepiece in accordance with the present invention.

The external appearance of an electronic timepiece in accordance with the present invention is shown in FIG. 1. A dial plate 16 is provided with apertures whereby digital and character information provided by a liquid crystal display cell situated immediately beneath dial plate 16 can be viewed, as indicated by numerals 10, 12 and 14. An area of dial plate 16 is also provided with markings 18 that serve as an analog display dial area, in which time information is displayed by time indicating hands 20. As can be seen from FIG. 1, the analog and digital display portions of an electronic timepiece in accordance with the present invention are combined in a novel and attractive fashion, to provide a display which is compact and easy to read.

Figure 2:
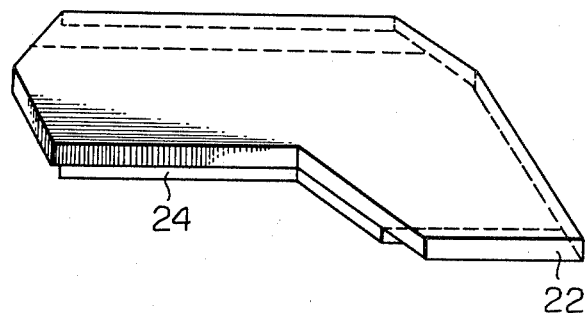
FIG. 2 shows the construction of a liquid crystal cell in accordance with the present invention.

FIG. 2 shows the construction of a liquid crystal cell for an electronic timepiece in accordance with the present invention, such as the embodiment shown in FIG. 1. The cell is composed of two substrates of thin glass 22 and 24, which are sealed at their common periphery, and have a liquid crystal material sealed between them.

Figure 3:
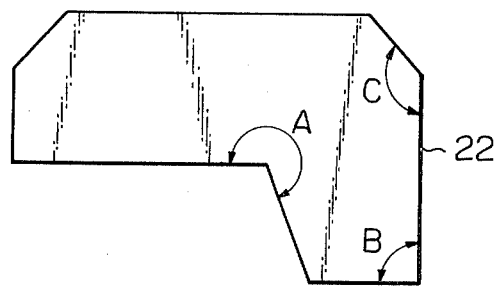
FIG. 3 is a plan view of a liquid crystal cell in accordance with the present invention.

FIG. 3 is a plan view of the liquid crystal cell of FIG. 2. As shown, the profile of the cell is in the form of a modified octagon, in which one interior angle is greater than 180°. For the embodiment shown in FIG. 3, the values of the internal angles of the octagon are as follows:

Angle A=250°, angle B=90°, and angle C=135°

In the case of liquid crystal cells of conventional design which are polygonal in profile, the internal angles $\theta$ are generally within the range:

$0° < \theta < 180°$

For the majority of such conventional liquid crystal cells, the internal angles are generally within the range:

$90° \leq \theta < 180°$

In the case of a liquid crystal cell in accordance with the present invention, interior angle A is within the range:

$180° < A < 360°$

Figure 4:
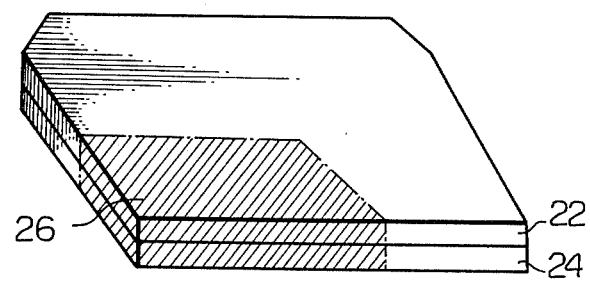
FIG. 4 is a diagram illustrating a method of producing liquid crystal cells as shown in FIG. 2 and FIG. 3.

Due to this range of values being possible for internal angle A, a liquid crystal cell as shown in FIG. 3 and FIG. 4 can be produced, so that, as shown in FIG. 1, an analog time display area containing time indicating hands can be accommodated in the area external to the area of the liquid crystal cell enclosed by angle A.

FIG. 4 shows a method of preparing a liquid crystal cell having the profile shown in FIG. 3. Cell substrates 22 and 24 have a hexagonal profile initially. Transparent electrodes and a molecular alignment layer are deposited upon the cell substrates 22 and 24, which are then sealed at their periphery. Hatched area 26 is then cut out of the substrates, a liquid crystal material is inserted between the substrates, and they are then completely sealed at the periphery. The substrates 22 and 24 are sealed together such as to maintain a separation of approximately 10 microns between them.

Figure 5:
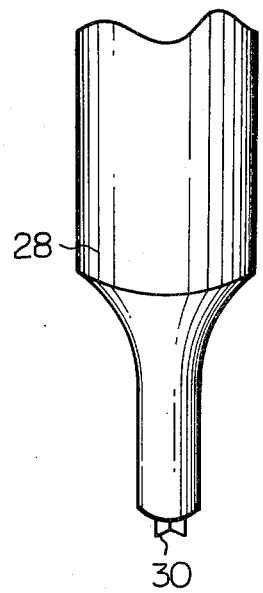
FIG. 5 shows parts of an ultrasonic machining tool which may be utilized to machine substrates for liquid crystal cells in accordance with the present invention.
Figure 6:
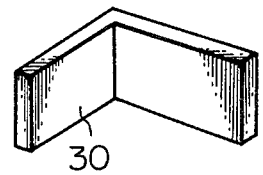
FIG. 6 shows the cutting blade of the ultrasonic machining tool shown in FIG. 5.

Various methods may be adopted to remove the hatch area 26 shown in FIG. 4. Such methods include the use of chemical etching processes, (for example, etching by fluoric acid), cutting by means of an ultrasonic tool, cutting by a diamond tipped tool, and cutting by a wire saw, etc. FIG. 5 shows the horn 28 and tip 30 of an ultrasonic cutting tool suitable for cutting the substrates of a liquid crystal cell in accordance with the present invention. FIG. 6 shows the tip of the tool, which has an L shaped cross-section.

Figure 7:
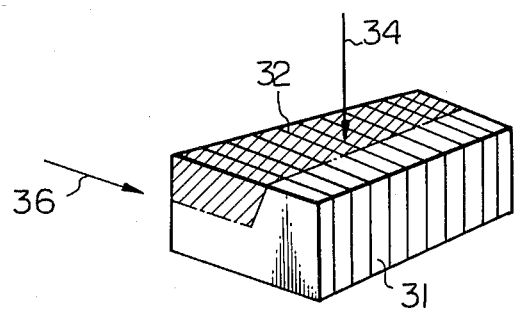
FIG. 7 is a diagram illustrating a method whereby a plurality of substrates for liquid crystal cells in accordance with the present invention can be rapidly produced by utilizing a machining tool such as a diamond bladed cutting tool.

If a diamond bladed cutting tool is employed to cut the liquid crystal cell substrates, then it is possible to machine a number of substrates together, as shown in FIG. 7. Here, a plurality of liquid crystal cells 31, which are of rectangular profile in this example, are attached side by side by means of a jig or by an adhesive agent such as wax. The cells are cut by the diamond bladed tool in the directions indicated by arrows 34 and 36, so as to remove hatched portion 32. The cells can then be separated.

Figure 8:
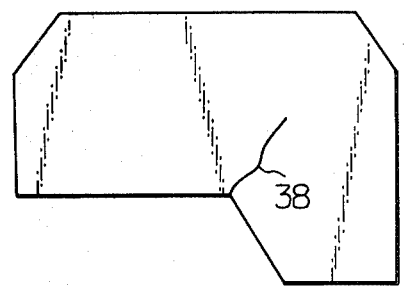
FIG. 8 is a diagram showing the result of drop tests performed upon liquid crystal cells in accordance with the present invention.
Figure 9:
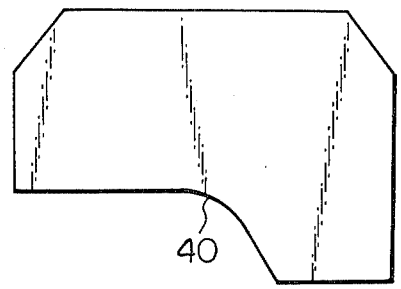
FIG. 9 is a diagram showing a modification of the profile of a liquid crystal cell in accordance with the present invention in order to prevent the defect shown in FIG. 8.

Tests have been performed upon liquid crystal cells having the profile shown in FIG. 3. The cells were actually assembled into wristwatches, and drop tests performed to determine their shock resistance. It was found that a drop test from a height of 2.5 meters resulted in cracks such as is illustrated in FIG. 8 by numeral 38. In order to overcome this defect, the profile of the liquid crystal cell may be modified as shown in FIG. 9. Interior angle A is modified to a smooth arcuate shape. If this is done, it is found that no cracks will develop of the type shown in FIG. 8.

Figure 10:
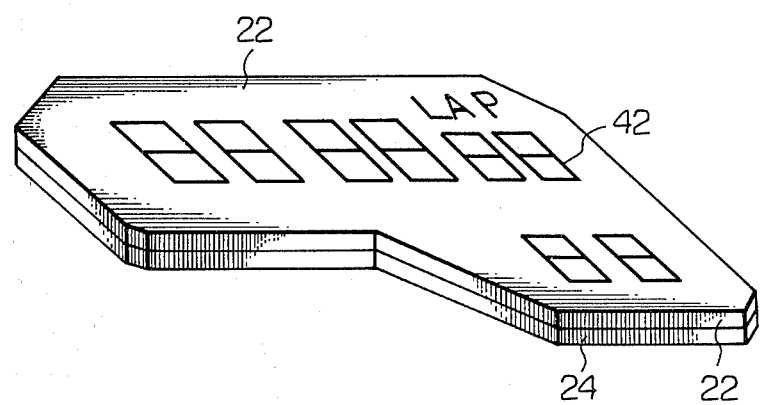
FIG. 10 is a diagram illustrating a liquid crystal cell in accordance with the present invention having electrodes deposited upon the substrates.
Figure 11:
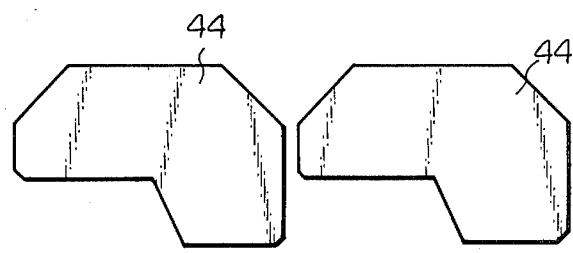
FIG. 11 shows the glass substrates of the liquid crystal cell of FIG. 10, in plan view.

Referring now to FIG. 10, a liquid crystal cell in accordance with the present invention is shown composed of upper and lower substrates 22 and 24, and provided with transparent electrodes deposited on the interior surfaces of the substrates so that digital and character data can be displayed as indicated by numeral 42. Upper and lower substrates 22 and 24 may be prepared from sections of glass plate having identical profiles, as indicated by numeral 44 in FIG. 11.

Figure 12:
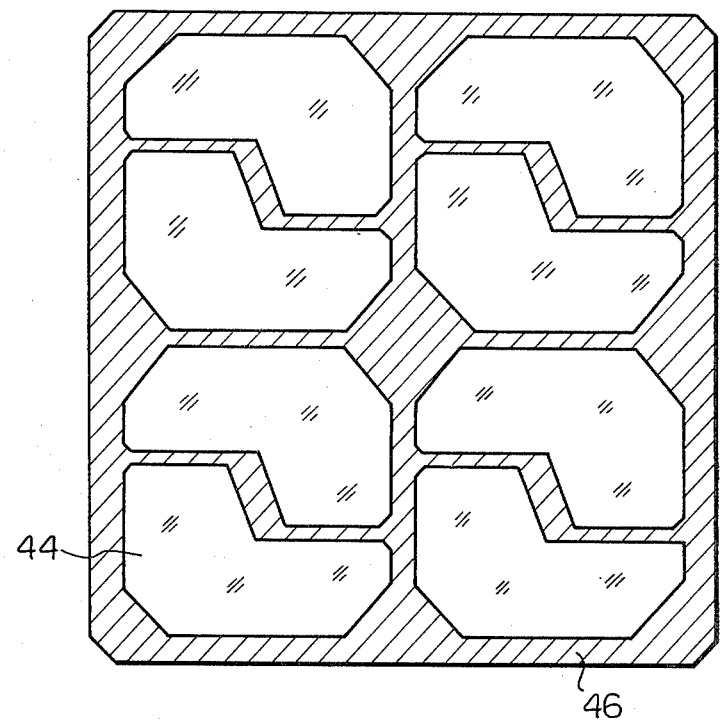
FIG. 12 is a diagram illustrating a method whereby a number of glass substrates shaped as shown in FIG. 11 can be obtained from a single large plate of glass.
Figure 13A:
FIGS. 13A to 13E illustrate a series of etching steps for producing glass substrates for liquid crystal cells in accordance with the present invention.
Figure 13B:
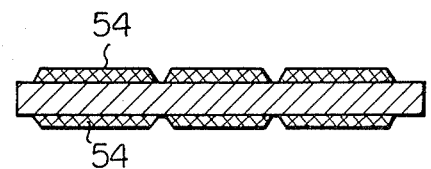
Figure 13C:
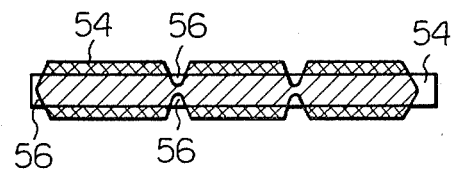
Figure 13D:
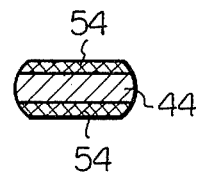
Figure 13E:
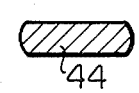

FIG. 12 indicates a method whereby a number of substrates 44 may be produced simultaneously from a single large plate of glass 46. This is done by chemically etching away the unnecessary portions of glass plate 46, as indicated by the hatched area in FIG. 12. Such a chemical etching process may be performed by the series of steps shown in FIGS. 13A to 13E. A section of glass sheet 46, which has not yet been etched, is shown at FIG. 13A. This has been previously lapped and polished to a predetermined thickness, for example of 0.44 mm, and to a surface flatness of better than 10 microns. Protective layers of etch resist 54 are formed on opposite sides of glass plate 46, as shown at FIG. 13B, by means of a screen printing process. After screen printing, the glass sheet 44 is dried for 15 minutes at a temperature of 50° to 100° C. Glass sheet 46 is then etched by fluoric acid, in order to remove unwanted areas 56, as shown in FIG. 13C. The result of this etching is to produce separate substrates, as shown at FIG. 13D, with some etch resist still adhering thereto. This etch resist is then removed by melting and washing it off, to leave the finished substrates 44, each having the profile shown in FIG. 12.

A method will now be described whereby pattern electrodes may be simultaneously formed on a plurality of substrates for liquid crystal display cells in accordance with the present invention, and the substrates themselves may then be simultaneously produced by a chemical etching process.

Referring to FIG. 14, a film of transparent conductive material is deposited on a large glass plate 46 of sufficient size to form a plurality of liquid crystal cell substrates. This is shown in FIG. 14A, the film of transparent conductive material being denoted by numeral 58 in FIG. 14B. In the step of FIG. 14C, a pattern of etch resist 60 is deposited upon transparent conductive layer 58, by a screen printing process, so as to define the areas of pattern electrodes 42. After etching, the resist is removed, to leave the pattern electrodes 42 exposed. Etching can be performed by using a 1 to 5% aqueous solution of sulfuric acid or hydrochloric acid.

The substrates are then washed and dried. A second pattern of etch resist is now applied to the surface of plate 46, comprising a material resistant to fluoric acid. This second pattern of etch resist defines the profiles of the liquid crystal cell substrates. Etching is then performed to produce the individual substrates having the desired profile, and the etch resist is then removed and the substrates are washed.

It will be apparent from the above description that the method of the present invention described therein will significantly increase the efficiency of production of liquid crystal cell substrates, and that substrates having almost any desired degree of complexity of profile may be produced.

Figure 15:
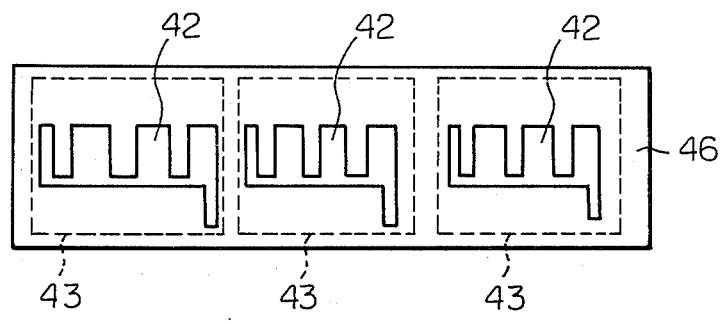
FIG. 15 shows a series of etching steps for producing a plurality of liquid crystal cell substrates by the method of FIG. 14.
Figure 14A:
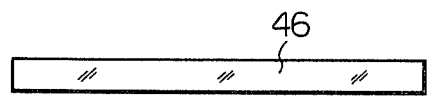
FIGS. 14A to 14G show plan views illustrating a method of forming a pattern of electrodes simultaneously on a plurality of liquid crystal cell substrates.
Figure 14B:
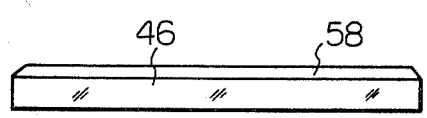
Figure 14C:
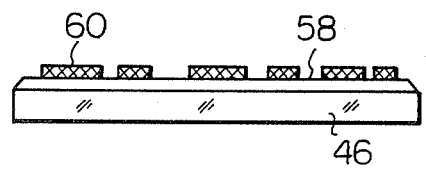
Figure 14D:
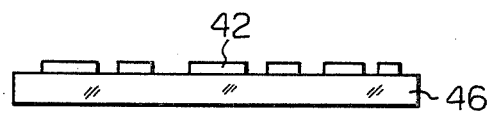
Figure 14E:
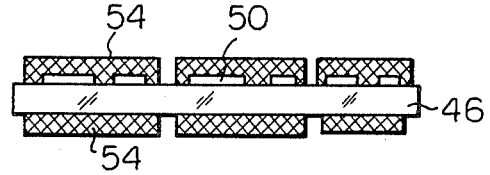
Figure 14F:
Figure 14G:
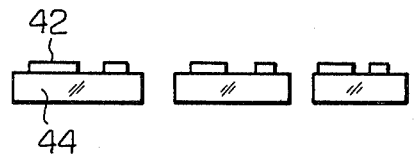

FIG. 15 illustrates the appearance of the large glass plate at an intermediate stage of the process described above. Numeral 42 indicates the transparent pattern electrodes deposited on glass plate 46, which in this case is sufficiently large to form three substrates. The areas shown within the dotted lines 43 are coated with etch resist as shown in FIG. 14E, before etching with fluoric acid, in order to define the profiles of the final cell substrates.

A method will now be described whereby a plurality of complete liquid crystal cells in accordance with the present invention may be formed simultaneously, from a pair of large plates of glass.

Figure 16:
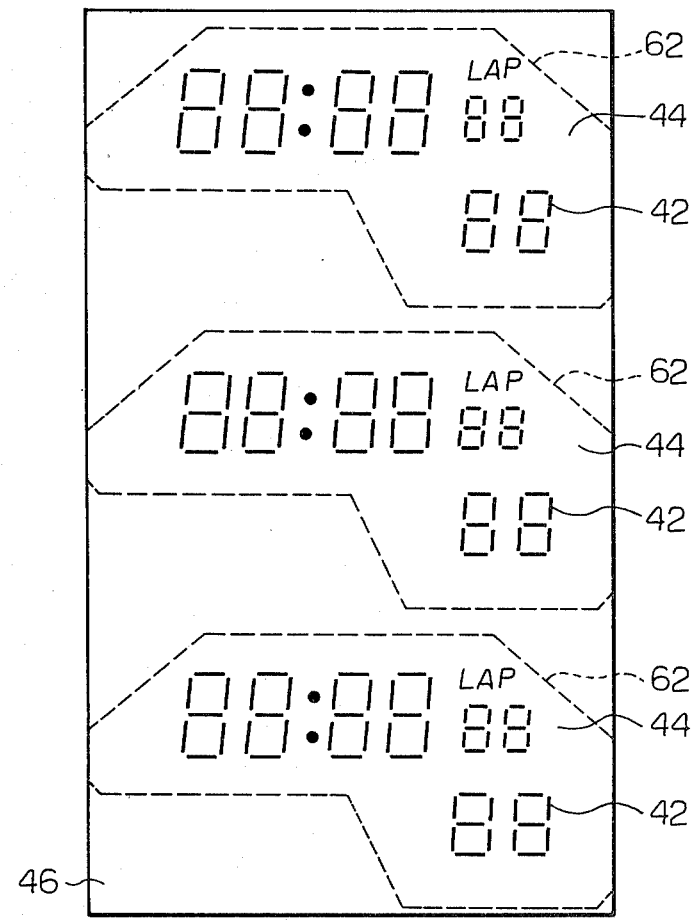
FIG. 16 is a plan view of a glass sheet having transparent electrodes for a plurality of liquid crystal cell substrates deposited thereon.

Referring to FIG. 16, a sheet of glass 46 is shown, which is sufficiently large to form three liquid crystal display cell substrates 44. Sets of pattern electrodes 42 are formed on a surface of glass plate 46. These pattern electrodes comprise a transparent layer of a conductive substance, such as indium oxide $In_2O_3$, or tin oxide $SnO_2$. Pattern electrodes 42 can be produced by depositing a film of the conductive substance over an entire surface of glass plate 46. This layer can then be photo-etched to produce sets of pattern electrodes 42 for each of liquid crystal display cell substrates 44 simultaneously. Alternatively, the pattern electrodes 42 may be formed by mask evaporation onto glass plate 46. Dotted lines 62 indicate the boundaries of the liquid crystal display cell substrates 44 which will be produced from glass plate 46.

Figure 17:
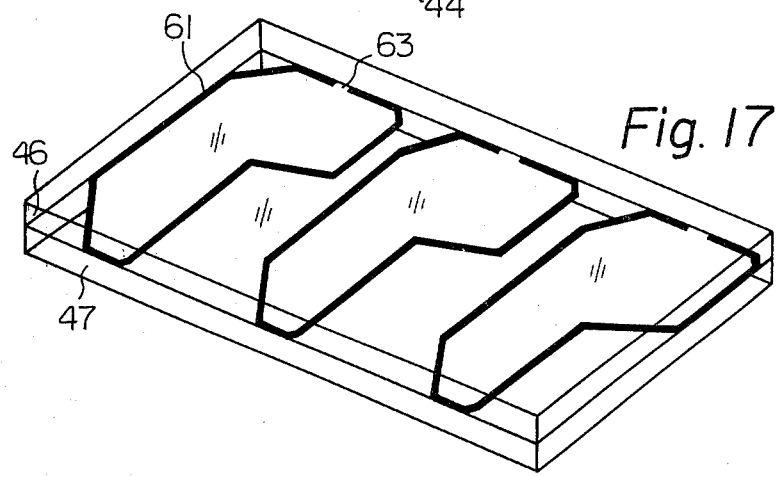
FIG. 17 is a diagram illustrating a method whereby a plurality of liquid crystal cell substrates may be sealed simultaneously by utilizing two sheets of glass as shown in FIG. 16.

Referring now to FIG. 17, a lower glass plate 47 is shown situated beneath glass plate 46. A sealing layer 61 is provided beforehand on either glass plate 46 or 47. This consists of a layer of glass having a low melting point, and can be formed by a screen printing process. Glass plates 46 and 47 are placed in contact, and baked at a temperature of approximately 480° C. A gap 63 is left in sealing layer 61, and a liquid crystal material is then introduced through this gap into each of the regions between glass plates 46 and 47 whose boundaries are determined by sealing layer 61. Each of the gaps 63 is then sealed so as to contain the liquid crystal material.

Figure 18:
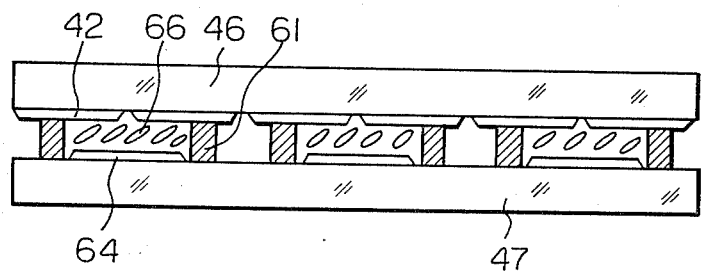
FIGS. 18 to 22 are diagrams illustrating a series of chemical etching steps whereby a plurality of liquid crystal cells may be simultaneously produced by utilizing glass sheets as shown in FIGS. 16 and 17; and, FIG. 23 shows a preliminary surface treatment which may be applied to the process shown in FIGS. 18 to 22.

FIGS. 18 to 22 illustrate the successive steps in etching glass plates 46 and 47 to produce separate liquid crystal cells simultaneously. FIG. 18 shows a simplified cross-sectional view of the assembly after liquid crystal material 66 has been introduced through gaps 63 and the gaps then sealed. For the example shown in FIG. 18, counter-electrodes 64 are deposited beforehand on glass plate 47, while an alignment control layer of SiO has been deposited upon the interior surfaces of glass plates 46 and 47 and upon the surfaces of pattern electrodes 42 and 64, in order to achieve alignment of the molecules of liquid crystal material 66 at a desired angle with respect to the substrate plane. Numeral 61 indicates the layer of sealing glass described above. Glass plates 46 and 47 are maintained at a spacing in the range 5 to 15 microns apart.

Figure 19:
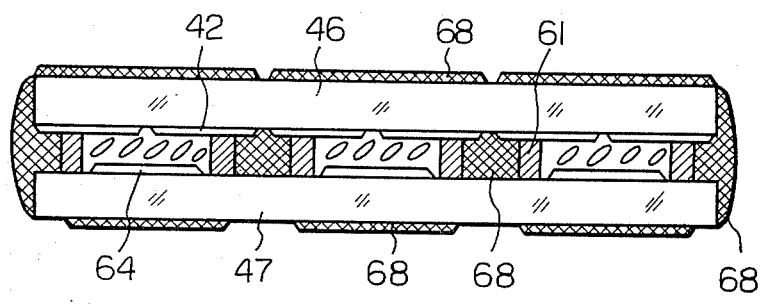

As shown in FIG. 19, an etch resist is now deposited upon the external surfaces of glass plates 46 and 47, in a predetermined pattern, by means of a screen printing process. Etch resist is also deposited around the periphery of the assembly, and in the gaps between glass plates 46 and 47, in order to protect portions of pattern electrodes 42 which extend outside sealing layer 61.

Figure 20:
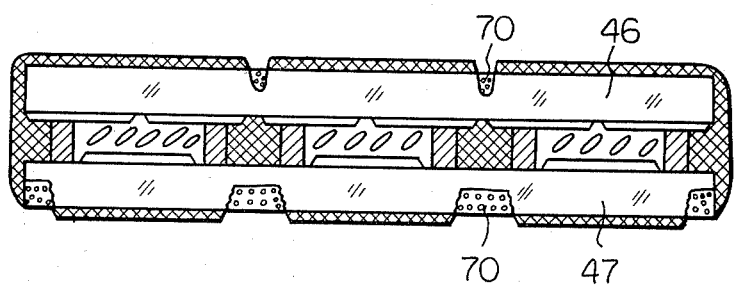

FIG. 20 indicates an intermediate stage of the etching process. As shown, areas of glass plates 46 and 47 left uncoated by etch resist are eroded and removed.

Figure 21:
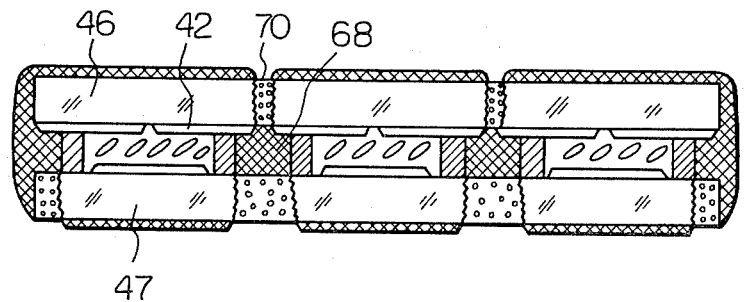
Figure 22:
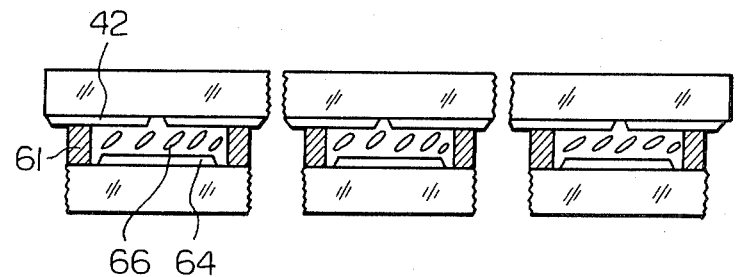

FIG. 21 shows the completion of the etching process. Glass plates 46 and 47 have now been completely penetrated by the etchant at desired positions, while pattern electrodes 42 are left undamaged. The etch resist is then removed, and the assembly is washed, thereby forming the separate liquid crystal display cells as indicated in FIG. 22. Although in the above description it was stated that the etch resist can be applied by a screen printing process, other methods may be adopted. A photo-etching type of method may be used, in which the etch resist is first applied by a spinner process, is then exposed to light through a negative mask, and then developed.

Figure 23:
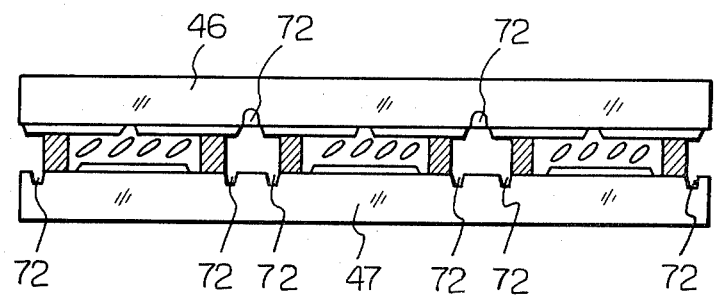

FIG. 23 illustrates a method which may be employed to improve the dimensional precision of the etching process shown in FIGS. 18 to 22. Grooves 72 are formed in upper and lower glass plates 46 and 47, by cutting with a diamond bladed tool or by etching.

It is preferable that the thickness of glass plates 46 and 47 be less than 0.5 mm, due to the requirements of the etching process.

What is claimed is:

1. A liquid crystal display cell for use in an electronic timepiece having combined analog and digital functions, comprising:
   a first glass substrate including a polygonal profile as viewed in plan, with at least one interior angle of said polygonal profile being within the range 180 degrees to 360 degrees, said first glass substrate including a first region having a first display section, and a second region having a second display section;

a second substrate arranged parallel to and adjacent to said first glass substrate, said second glass substrate having a profile identical to said polygonal profile of said first glass substrate as viewed in plan and regions being equal to said first and second regions of said first glass substrate;

transparent electrodes deposited upon surfaces of said first and second glass substrates to provide said first and second display sections;

a sealant material provided around the periphery of said first and second glass substrates; and a layer of liquid crystal material sealed between said first and second glass substrates by said sealant material;

said first and second glass substrates being formed with said polygonal polygonal profile by means of an etching process applied to large plates of glass;

said transparent electrodes being deposited upon surfaces of said large plates of glass prior to said etching process being executed;

said sealant material being provided on the surfaces of said large plates of glass corresponding to the periphery of said first and second glass substrates, prior to said etching process being executed;

said layer of liquid crystal material being sealed between said large plates of glass by said sealant material prior to said etching process being executed.

2. A liquid crystal display cell for use in an electronic timepiece having combined analog and digital display functions, comprising:

a first glass substrate including a polygonal profile as viewed in plan, with at least one interior angle of said polygonal profile being within the range 180 degrees to 360 degrees, said first glass substrate including at least a part of said polygonal profile having a smooth arcuate shape, a first region having a first display section and a second region having a second display section;

a second glass substrate arranged parallel to an adjacent to said first glass substrate having a profile identical to said polygonal profile of said first glass substrate as viewed in plan, and regions and a smooth arcuate shaped part being equal to said first and second regions and said part of said first glass substrate, respectively;

transparent electrodes deposited upon surfaces of said first and second glass substrates to provide said first and second display sections;

a sealant material provided around the periphery of said first and second glass substrates; and a layer of liquid crystal material sealed between said first and second glass substrates by said sealant material;

said first and second glass substrates being formed with said polygonal profile by means of an etching process applied to large plates of glass;

said transparent electrodes being deposited on surfaces of said large plates of glass prior to said etching process being executed;

said sealant material being provided on the surfaces of said large plates of glass corresponding to the periphery of said first and second glass substrates, prior to said etching process being executed;

said layer of liquid crystal material being sealed between said large plates of glass by said sealant material prior to said etching process being executed.

* * * * *